Oct. 4, 1955     F. MARTINDELL     2,719,888
APPARATUS FOR SYNCHRONIZING MOTORS
Filed April 24, 1951     2 Sheets-Sheet 1

INVENTOR
FRANK MARTINDELL
BY Emery Robinson
ATTORNEY

Oct. 4, 1955    F. MARTINDELL    2,719,888
APPARATUS FOR SYNCHRONIZING MOTORS
Filed April 24, 1951    2 Sheets-Sheet 2
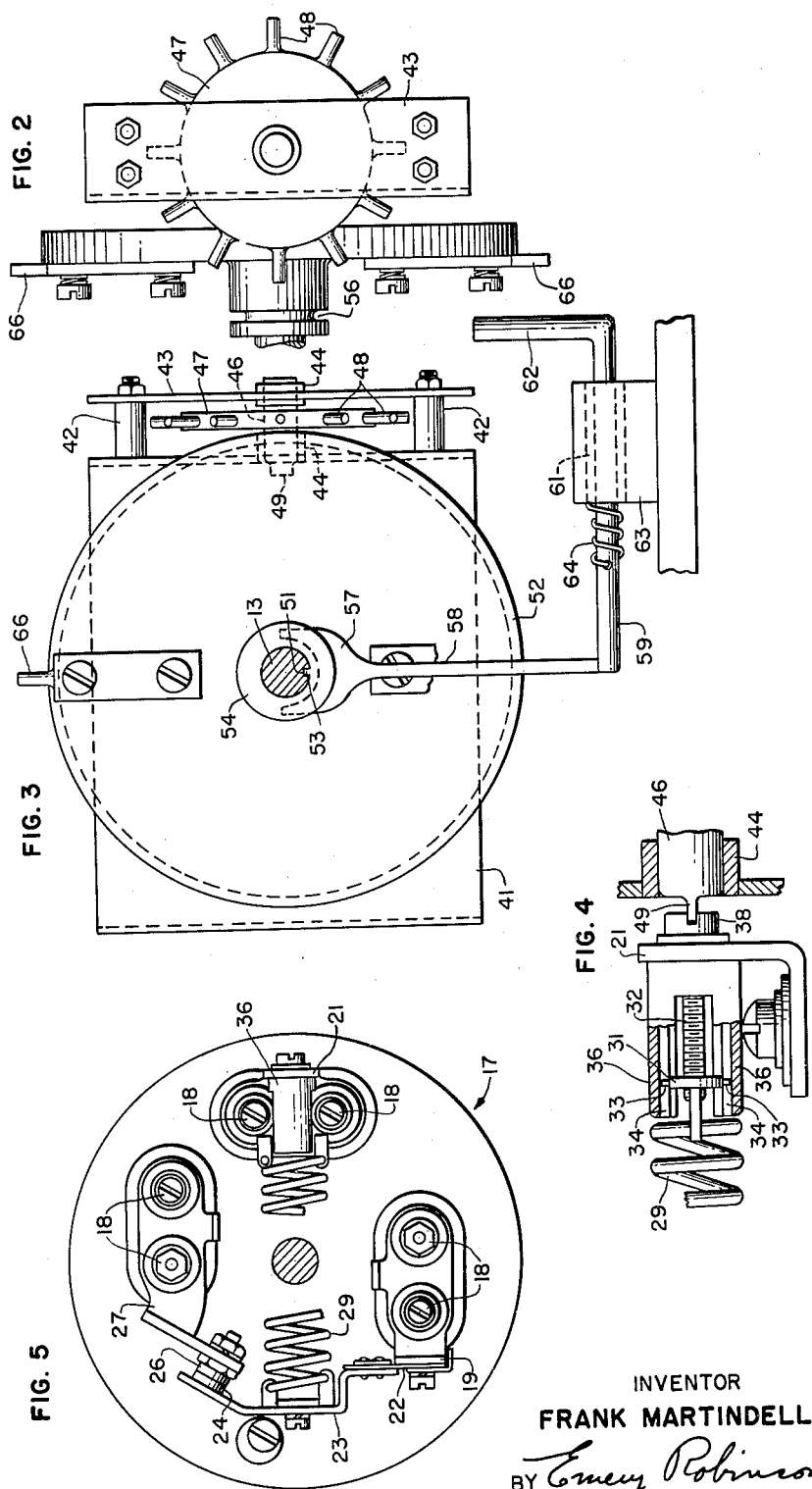
INVENTOR
FRANK MARTINDELL
BY Emery Robinson
ATTORNEY United States Patent Office 2,719,888
Patented Oct. 4, 1955

2,719,888

APPARATUS FOR SYNCHRONIZING MOTORS

Frank Martindell, Western Springs, Ill., assignor to Teletype Corporation, Chicago, Ill., a corporation of Delaware Application April 24, 1951, Serial No. 222,615

2 Claims. (Cl. 200—80)

This invention relates to a method of and apparatus for synchronizing motors and more particularly to a method of and apparatus for utilizing a speed responsive centrifugal governor for controlling one of a pair of motors to be maintained at constant speed.

In the utilization of many types of machinery and apparatus, it often becomes necessary to employ two motors running at synchronous speeds to obtain a power drive for such machinery and apparatus. Heretofore, devices have been devised wherein the speed of one motor is regulated in respect to the speed of another motor by the use of control circuits. In such instances whenever the speed of one motor varied in respect to the speed of the other motor, the motors were brought into synchronization by varying the electrical characteristics of one or both of the motors through the use of an interconnecting control circuit for controlling the operating circuits of each individual motor. Need has arisen for providing a mechanical system for interconnecting the two motors in order to maintain their speed constant with respect to each other. In such a system the control is obtained by a mechanical interconnection between the motors to control a speed responsive governor for one of the motors.

It is a primary object of this invention to provide a method and apparatus utilizing mechanical expedients for obtaining a synchronization of two motors.

An equally important object of the present invention is to provide a method and apparatus for adjusting a motor governor to operate at a preselected speed.

It is a further object of this invention to provide mechanical means operative in response to a speed differential existing between two motors for operating a speed responsive regulator for one of the motors.

Another object of this invention is the provision of a simple and economical method of utilizing a differential in angular velocity existing between two motors for obtaining a synchronization of the motors in a positive and uniform manner.

With these and other objects in view, the present invention contemplates a method of utilizing a speed differential existing between two motors to vary the mechanical characteristics of a speed responsive governor connected to one of the motors. The apparatus used comprises a centrifugal type speed responsive governor connected to and driven by a controlled motor which regulates the speed of that motor within close limits of consistency. The operation of the speed responsive governor is controlled through the agency of a spring connected to an adjusting fixture for varying the spring tension to control the operation of the governor. A constant speed controlling motor drives a disc having arms extending therefrom which are positioned to engage and operate the adjusting fixture on the centrifugal governor whenever a differential in speed exists between the controlling and controlled motor. Upon a differential existing between the two motors, the engaging arms operate the adjusting fixture to vary the spring tension of the centrifugal governor, hence increasing or decreasing the rate of speed at which centrifugal governor operates to regulate the speed of the controlled motor.

Other objects and advantages of the present invention will be apparent from the following detailed description when considered in conjunction with the accompanying drawings, wherein;

Fig. 2 is a top plan view of the control fixture for the speed responsive governor;

Fig. 3 shows an end view of the control means driven by the controlling motor;

Fig. 4 is a cross sectional view showing the adjusting features of the centrifugal governor; and Fig. 5 is a side elevational view illustrating a typical centrifugal type speed responsive governor.

Figure 1:
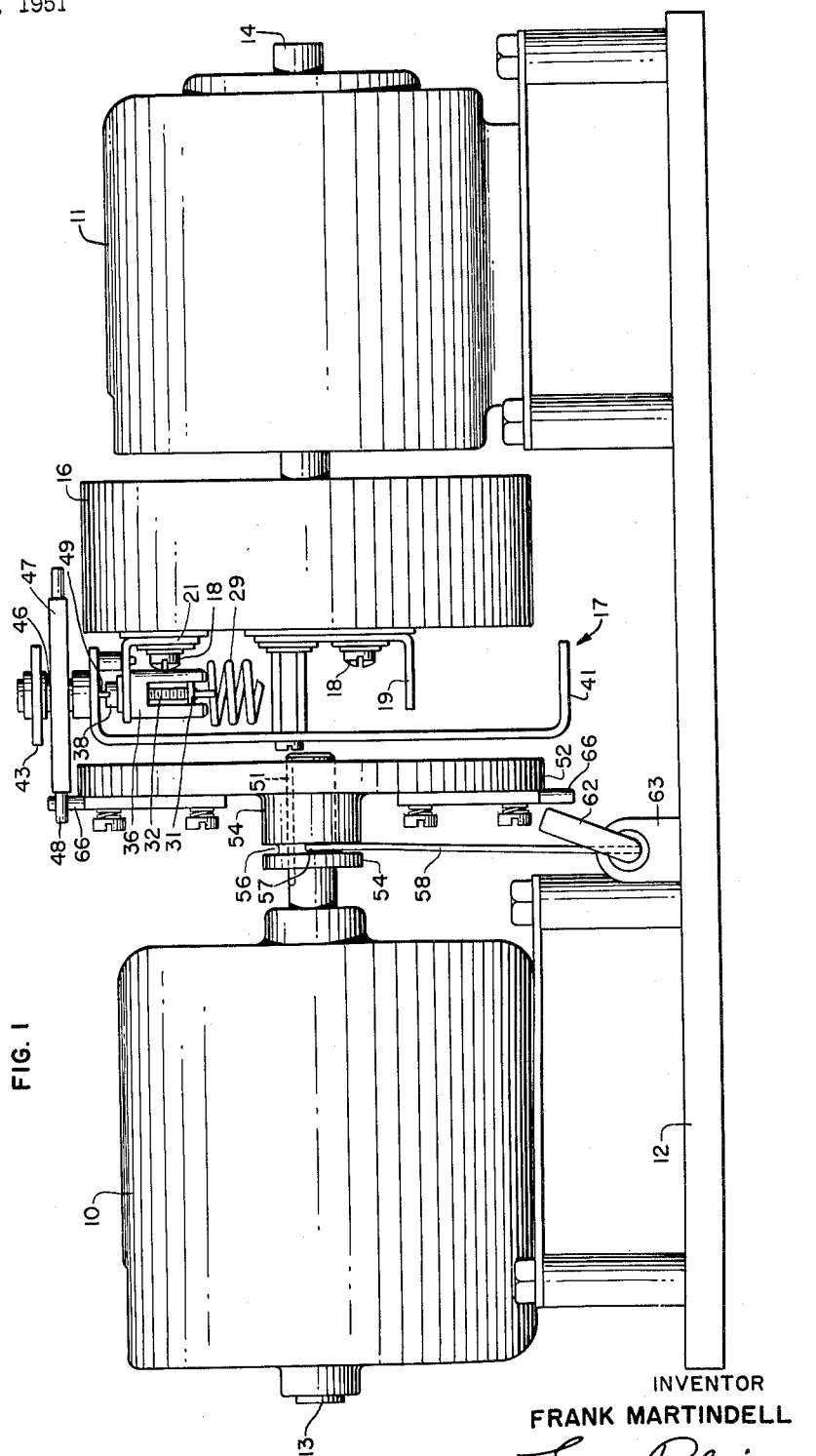
Fig. 1 is a front elevational view disclosing a pair of motors interconnected by a mechanical control device embodying the principal features of the invention.

Referring to Fig. 1, there is shown a pair of motors 10 and 11 mounted on a base 12 having their driven shafts 13 and 14 in alignment with each other. The motor 10 will be referred to hereinafter as the controlling motor and is of a synchronous type having constant speed characteristics. The motor 11 will be hereinafter referred to as the controlled motor and is of a universal type which may be operated on either A. C. or D. C. current. Fixed to the shaft 14 is a commutator 16 to which a pair of brushes (not shown) cooperate. These brushes are connected in the circuit of the controlled motor 11 in any usual well known manner.

A centrifugal type speed responsive governor 17 is mounted on the commutator 16 by means of screws 18 and brackets 19 and 21. Attention is directed to Fig. 5 wherein a leaf spring 22 is shown as being secured to the bracket 19 and has attached thereto a movable contact arm 23. Attached to the free end of the contact arm 23 is a movable contact 24. Cooperating with the movable contact 24 is a fixed contact 26 mounted on a bracket 27 secured to the commutator 16 by screws 18. As the governor 17 rotates with the motor 11, the movable contact 24 is urged outwardly by centrifugal force to separate from the fixed contact 26. In order to retain the contacts 24 and 26 in engagement with each other a spring 29 is connected at one end to the movable contact arm 23 and at its other end to a guide plate 31. As shown in Fig. 4 the guide plate 31 is provided with a threaded aperture for the reception of an adjusting screw 32. In addition the guide plate is provided with a pair of ears 33 which ride within guide channels 34 formed in the inner surface of a sleeve 36. The sleeve 36 is fastened to the bracket 21 which has an aperture therein to permit the passage of the screw 32 therethrough. The screw 32 is provided with a notched head 38 which spans the aperture in the bracket 21. Consequently any movement of the screw 32 moves the plate 31 in the guide channels 34 of the sleeve 36 to vary the tension of the spring 29 imparted to the movable contact arm 23. Tightening of the screw results in a greater centrifugal force being required to overcome the effect of the tension spring which controls the opening of the contacts 24 and 26 to regulate the speed of the motor 11. It is to be understood that the contacts 24 and 26 are electrically connected through the commutator 16 to the control circuit of the motor 11. This control circuit may include inductance, resistance, capacitance impedance, which may be cut in and out of the control circuit of the motor 11 by the opening and closing of the contacts 24 and 26.

A cover 41 is provided for the governor 17 and has mounted thereon a pair of studs 42 which support a cross bar 43 (see Figs. 1, 2 and 3). A pair of bearings 44 are secured within a pair of apertures in the cover 41 and cross member 43 respectively. Positioned within the bearings 44 is a spindle shaft 46 having secured thereto a disc 47. Secured to the peripheral surface of a disc 47 is a plurality of radially extending pins 48. The shaft 46 is tapered at one end to provide a blade 49 which fits within the notch in the screw head 38.

Referring now to Figs. 1 and 3 the shaft 13 of the motor 10 is provided with a keyway 51. An apertured disc 52 having a key 53 formed within its aperture is slideably mounted on the shaft 13. The disc 52 is provided with a hub 54 having a circumferential groove 56 formed therein. Positioned within the groove 56 is a yoke 57 connected by a link 58 to a shaft 59. The shaft 59 is rotatably mounted within a bearing 61 and has provided on its outer extremity an operating handle 62. The bearing 61 is secured within an apertured boss 63 mounted on the base 12. In order to urge the disc 52 towards the left, as viewed in Fig. 1, a helical torsion spring 64 is secured at one end to the shaft 59 and at its other end to the boss 63. Operation of the handle 62 towards the right, as viewed in Fig. 1, moves the disc 52 towards the motor 11 for the purpose of bringing a plurality of arms 66 extending from the disc 52 into the orbit of the pins 48.

The arms 66, as shown in the drawings, are two in number and are diammetrically opposed to extend beyond the periphery of the disc 52. It is to be understood that the apparatus will function satisfactorily with a greater number of arms 66, the number of arms utilized being determined by the degree of control desired between the two motors 10 and 11.

In operation of the apparatus and practice of the method the handle 62 is released to move the arms 66 out of the orbit of the pins 48. The motors 10 and 11 are then started and when it is desired to synchronize the speed of these motors, the handle 62 is rotated in a clockwise direction and held there by hand or retained by a suitable latch (not shown). Upon a differential in speed existing between the shafts 13 and 14, the arms 66 will rotate faster or slower than the governor 17, hence engaging the pins 48 to rotate the disc 47 and the tapered end 49 of the shaft 46 to move the screw 32 to vary the tension of the spring 29 in proportion with the differential in speed existing between the shafts 13 and 14. If the speeds of the motors 10 and 11 are the same, then the disc 52 and its arms 66 rotate in unison with the governor 17. The arms 66 neither gain nor recede from the pins 48. Consequently, the adjustment of the governor 17 remains constant to maintain the speed of the motor 11 in accordance with this particular setting of the adjusting screw 32.

Considering now the situation wherein the controlled motor 11 is operating at a speed in excess to that of the controlling motor 10, the shaft 14 will carry the governor 17 and the disc 47 mounted thereon in a movement relative to that of the disc 52. In such a situation the pins 48 approach the arms 66 until there is engagement between such members to cause the disc 47 to rotate. Movement of the disc 47 rotates the tapered end 49 of the shaft 46 to back up the screw 32 to cause the plate 31 to move downwardly to reduce the tension in the spring 29. Reduction of tension in the spring 29 results in the opening of the contacts 24 and 26 at reduced speeds so that the motor 11 is slowed down until the speeds of the motors 10 and 11 are the same.

Considering now the situation wherein the speed of the controlled motor 10 exceeds that of the controlling motor 11, when this occurs relative angular rotation exists between the shafts 13 and 14 so that the arms 66 tend to overtake and engage the pins 48. When this occurs the shaft 46 is rotated to take up the screw 32 to move the guide plate 31 up on the screw resulting in an increase in tension in the spring 29. The effect of increasing the tension in the spring 29 is that a greater centrifugal force is now necessary to open the contacts 24 and 26 of the motor control circuit for the motor 11.

Manifestly the motor 11 speeds up until sufficient centrifugal force is imparted to the movable contact 24 to open said contact to interrupt the motor control circuit of the motor 11 whereby the motor is maintained at its new speed.

In summation therefore, it may be observed that a method is provided wherein the relative angular velocity existing between two shafts is utilized to control the operation of a speed responsive centrifugal type governor to control the speed of the controlled motor.

The invention has been heretofore described in relation to a method and apparatus for synchronizing two motors, operating at all times, in close proximity to each other. However, the invention finds additional utility as a simple method and apparatus for adjusting motor governors. In situations wherein motor governors are out of adjustment or it is desired to change the adjustment, the motors may be adjusted to operate at a preselected speed by utilizing the method and apparatus of the present invention.

A motor to be adjusted and having an adjustable centrifugal governor, similar or identical to the governor shown in Fig. 5, is mounted on the base 12 in place of the controlled motor 11. The adjusting elements, the disc 47, the pins 48, the shaft 46 and its blade 49 are mounted on the governor cover 41 in the manner described in regard to the controlled motor 11.

In operation, the motors are started and are brought up to their respective rated speeds. The handle 62 is then moved toward the right, to the position shown in Fig. 1, whereupon the arms 66 are brought within the orbit of the pins 48. Upon the existence of any variance in the angular velocities of the two motor shafts, the arms 66 and pins 48 engage to rotate the blade 49 to adjust the screw 32 of the governor attached to the unadjusted motor. As previously indicated, movement of the screw 32 results in an increased or decreased tension in the spring 29 dependent upon the direction of movement of the screw 32. If the screw 32 is taken up, the centrifugal force necessary to open the contacts 24 and 26 is increased and manifestly if the screw 32 is backed up, the centrifugal force necessary to open the contacts 24 and 26 is decreased. Adjustment of the screw 29 by the blade 49 continues until the two motor shafts are rotating in unison whereupon movement of the pins 48 by the arms 66 ceases. The motor is now adjusted and is then removed from the base 12 for use at a location remote from that of the controlling motor 10. The adjusted motor is now adapted to run at the preselected speed of the controlling motor 10.

It is to be understood that the above described methods, arrangements of apparatus and construction of elemental parts are simply illustrative of the application of the principles of the invention and many other modifications may be made without departing from the spirit and scope of the invention.

What is claimed is:

1. In combination, a first rotating shaft, a governor including a casing therefor mounted on said first shaft, a centrifugally operated contact movably mounted within said casing, a spring connected to said contact for holding said contact against the action of centrifugal force, adjusting means for changing the effective force of the spring, a spindle shaft connected at one end to said adjusting means and extending radially through said casing, a wheel secured to the other end of said spindle shaft in a plane parallel to the axis of rotation of said first shaft, a plurality of pins radially extending from the periphery of the wheel, a second rotating shaft having its axis of rotation coextensive with the axis of rotation of said first shaft, a disc mounted on the second shaft in a plane transverse to the axis of rotation of said second shaft, and a number of arms extending radially of the disc so that the path of rotation of these arms intersects the orbit of rotation of the pins mounted on the wheel.

2. In combination, a first rotating shaft, a centrifugal governor mounted on said first shaft, a screw threadably mounted within the governor for adjusting the rated speed at which the governor operates, a wheel rotatably mounted on the governor for planetary movement about said first shaft, a plurality of radially projecting pins secured to the periphery of the wheel, means interconnecting the wheel and the screw for transmitting movement of the wheel about its axis to the screw, a second rotating shaft having its axis of rotation coextensive with the axis of rotation of the first rotating shaft, a disc mounted for movement with and along said second shaft, a plurality of arms radially extending from said disc, means for holding said disc in position so that the path of rotation of the arms does not intersect the orbit of rotation of the pins extending from the wheel, and means for longitudinally moving the disc along the second shaft to move the path of rotation of the arms into the orbit of rotation of the pins.

References Cited in the file of this patent

UNITED STATES PATENTS

| | | |
|---|---|---|
| 236,009 | Edelen | Dec. 28, 1880 |
| 303,059 | Sinnamon | Aug. 5, 1884 |
| 1,665,939 | Staege | Apr. 10, 1928 |
| 1,683,536 | Ferree et al. | Sept. 4, 1928 |
| 1,750,361 | Rothermel et al. | Mar. 11, 1930 |
| 2,125,474 | Wachs | Aug. 2, 1938 |
| 2,252,545 | Benz | Aug. 12, 1941 |
| 2,374,083 | Drake | Apr. 17, 1945 |
| 2,390,144 | Gossling | Dec. 4, 1945 |

FOREIGN PATENTS

| | | |
|---|---|---|
| 500,893 | Great Britain | Feb. 17, 1939 |